(12) United States Patent
Pu

(10) Patent No.: US 12,189,990 B2
(45) Date of Patent: Jan. 7, 2025

(54) DATA STORAGE METHOD AND APPARATUS

(71) Applicant: HUAWEI TECHNOLOGIES CO., LTD., Shenzhen (CN)

(72) Inventor: Guiyou Pu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 17/677,088

(22) Filed: Feb. 22, 2022

(65) Prior Publication Data

US 2022/0179588 A1 Jun. 9, 2022

Related U.S. Application Data

(63) Continuation of application No. PCT/CN2020/088838, filed on May 6, 2020.

(30) Foreign Application Priority Data

Aug. 28, 2019 (CN) .......................... 201910800842.8

(51) Int. Cl.
*G06F 3/06* (2006.01)
(52) U.S. Cl.
CPC .......... *G06F 3/0659* (2013.01); *G06F 3/0604* (2013.01); *G06F 3/0685* (2013.01)
(58) Field of Classification Search
CPC .... G06F 3/0659; G06F 3/0604; G06F 3/0685; G06F 3/06–0689
See application file for complete search history.

(56) References Cited

U.S. PATENT DOCUMENTS 11,075,987 B1 * 7/2021 Solapurkar ......... H04L 67/1023
2009/0300450 A1 * 12/2009 Tzannes ................ H04L 1/0041
711/170

(Continued)

FOREIGN PATENT DOCUMENTS

CN 101425338 A 5/2009
CN 101571832 A 11/2009
(Continued)

OTHER PUBLICATIONS

Hajkazemi, Mohammad Hossein, et al. "Adaptive bandwidth management for performance-temperature trade-offs in heterogeneous HMC+ DDRx memory." Proceedings of the 25th edition on Great Lakes Symposium on VLSI. 2015. (Year: 2015).*

(Continued)

*Primary Examiner* — Nicholas J Simonetti
(74) *Attorney, Agent, or Firm* — Maier & Maier, PLLC

(57) ABSTRACT

A data storage method and apparatus. The embodiments include receiving first data and a latency level identifier of the first data, where the latency level identifier of the first data is for indicating a requirement level of the first data for access latency; determining, based on the latency level identifier of the first data and correspondences between memory pages of different types and latency level identifiers, that a memory page corresponding to the first data is a first memory page of storage device, where the storage device includes the first memory page and a second memory page, the first memory page and the second memory page are of different types, memory pages of different types have different access latency; and storing the first data on the first memory page.

16 Claims, 8 Drawing Sheets

(56) References Cited

U.S. PATENT DOCUMENTS

| | | | |
|---|---|---|---|
| 2011/0019685 A1* | 1/2011 | Diab | H04L 47/28 |
| | | | 370/412 |
| 2012/0089791 A1 | 4/2012 | Oberhofer et al. | |
| 2014/0095770 A1 | 4/2014 | Huang et al. | |
| 2014/0156967 A1 | 6/2014 | Meir | |
| 2015/0277802 A1* | 10/2015 | Oikarinen | G06F 3/0689 |
| | | | 711/114 |
| 2016/0054922 A1* | 2/2016 | Awasthi | G06F 3/0685 |
| | | | 711/170 |
| 2017/0168729 A1* | 6/2017 | Faulkner | G06F 3/0613 |
| 2018/0275923 A1* | 9/2018 | Earhart | G06F 3/0604 |
| 2020/0159419 A1* | 5/2020 | Li | G06F 3/068 |
| 2021/0011852 A1* | 1/2021 | Pletka | G06F 12/0246 |

FOREIGN PATENT DOCUMENTS

| | | | |
|---|---|---|---|
| CN | 102609360 A | 7/2012 | |
| CN | 103608782 A | 2/2014 | |
| CN | 104813270 A | 7/2015 | |
| CN | 106155586 A | 11/2016 | |
| CN | 107967121 A | 4/2018 | |
| EP | 2525293 A1 | 11/2012 | |

OTHER PUBLICATIONS

Li, Ning, et al. "Storage sharing optimization under constraints of SLO compliance and performance variability." IEEE Transactions on Services Computing 12.1 (2016): 58-72. (Year: 2016).*

Du, Yajuan, et al. "Enhancing SSD performance with LDPC-aware garbage collection." 2017 IEEE 6th Non-Volatile Memory Systems and Applications Symposium (NVMSA). IEEE, 2017. (Year: 2017).*

* cited by examiner

DATA STORAGE METHOD AND APPARATUS

CROSS-REFERENCE TO RELATED APPLICATIONS

This application is a continuation of International Application No. PCT/CN2020/088838, filed on May 6, 2020, which claims priority to Chinese Patent Application No. 201910800842.8, filed on Aug. 28, 2019. The disclosures of the aforementioned applications are hereby incorporated by reference in their entireties.

TECHNICAL FIELD

The embodiments relate to the field of storage technologies, and a data storage method and apparatus.

BACKGROUND

To implement hierarchical storage of data, a hierarchical storage system is usually used. Currently, a common hierarchical storage system is usually as shown in FIG. 1. The hierarchical storage system usually includes: a processor 110, an interface card 210, and a plurality of storage devices that are connected to the processor 110 by using the interface card 210 and that have different read/write latency. In FIG. 1, the different types of storage devices may be a first storage device 310, a second storage device 320, and a third storage device 330. For example, in the hierarchical storage system, the storage device having different read/write latency may be a storage class memory (SCM), a solid-state drive (SSD), and a hard disk drive (HDD). Data in a memory can be stored in different types of storage devices by using the hierarchical storage system.

Because the plurality of storage devices having different read/write latency is configured in the hierarchical storage system, data having a higher requirement on a storage speed is stored in a storage device having lower read/write latency, and data having a lower requirement on the storage speed is stored in a storage device having higher read/write latency, so that data having different storage requirements are stored in storage devices having different read/write latency, in other words, hierarchical storage of data is implemented. For example, because read/write latency of an SCM is lower than read/write latency of an SSD, data having a higher requirement on the storage speed may be stored in the SCM and data having a lower requirement on the storage speed may be stored in the SSD, thereby implementing hierarchical storage.

However, in a research process of this disclosure, it is found that at least two storage devices having different read/write latency need to be configured in an existing hierarchical storage system. Consequently, the configuration of the hierarchical storage system is relatively complex.

SUMMARY

To resolve a problem that a configuration of a hierarchical storage system is relatively complex because at least two storage devices having different read/write latency need to be configured in an existing hierarchical storage system, embodiments disclose a data storage method and apparatus.

According to a first aspect, an embodiment provides a data storage method. The method is applied to a storage device, where the storage device includes at least a first memory page and a second memory page, the first memory page and the second memory page are of different types, memory pages of different types have different read/write latency, and the method includes:
receiving first data and a latency level identifier of the first data, where the latency level identifier of the first data is used to indicate a requirement level of the first data for read/write latency;
determining, based on the latency level identifier of the first data and correspondences between memory pages of different types and latency level identifiers, that a memory page corresponding to the first data is the first memory page; and
storing the first data on the first memory page.

According to the solution in this embodiment, differences between read/write latency of various memory pages in the storage device are used to implement hierarchical storage of data. By using the solution in this embodiment, only one storage device needs to be configured in a hierarchical storage system to implement hierarchical storage, thereby resolving the problem that the configuration of the existing hierarchical storage system is relatively complex.

Before the storing the first data on the first memory page, the method may further include:
determining that the first memory page has a sufficient available capacity to store the first data.

The method may further include:
receiving second data and a latency level identifier of the second data, where the latency level identifier of the second data is used to indicate a requirement level of the second data for read/write latency;
determining, based on the latency level identifier of the second data and correspondences between memory pages of different types and latency level identifiers, that a memory page corresponding to the second data is the first memory page;
when the available capacity of the first memory page is insufficient to store the second data, selecting the second memory page from memory pages included in the storage device, where a difference between read/write latency of the second memory page and read/write latency of the first memory page is less than a preset threshold; and
writing the second data to the second memory page.

Through the foregoing step, the storage device can further implement hierarchical storage of the second data.

In an optional implementation, after the storing the first data on the first memory page, the method further includes:
when the latency level identifier of the first data is changed, migrating the first data from the first memory page to another memory page corresponding to a changed latency level identifier.

Through the foregoing step, the first data can be migrated. In addition, compared with the existing hierarchical storage system, solutions in various embodiments can simplify data migration operations, improve data migration efficiency, and reduce occupation of a processor.

In an optional implementation, before the migrating the first data from the first memory page to another memory page corresponding to a changed latency level identifier, the method further includes: monitoring that a migration condition has been satisfied.

According to the foregoing step, the storage device performs data migration after the migration trigger condition is satisfied. In a process of waiting for satisfaction of the migration trigger condition, a data migration event may still occur sometimes. In this case, other to-be-migrated data and the first data may be migrated together, thereby reducing a quantity of times of data migration and simplifying a migration trigger process.

In an optional implementation, when a migration instruction corresponding to the first data is received, whether the latency level identifier of the first data is changed is determined based on the latency level identifier of the first data included in the migration instruction.

In an optional implementation, the storage device is a solid-state drive (SSD).

According to a second aspect, an embodiment discloses a data storage apparatus. The apparatus is applied to a storage device, where the storage device includes at least a first memory page and a second memory page, the first memory page and the second memory page are of different types, memory pages of different types have different read/write latency, and the apparatus includes:

a transceiver unit, configured to receive first data and a latency level identifier of the first data, where the latency level identifier of the first data is used to indicate a requirement level of the first data for read/write latency; and a processing unit, configured to: determine, based on the latency level identifier of the first data and correspondences between memory pages of different types and latency level identifiers, that a memory page corresponding to the first data is the first memory page; and store the first data on the first memory page.

In an optional implementation, the processing unit is further configured to: before storing the first data on the first memory page, determine that the first memory page has a sufficient available capacity to store the first data.

In an optional implementation, the transceiver unit is further configured to receive second data and a latency level identifier of the second data, where the latency level identifier of the second data is used to indicate a requirement level of the second data for read/write latency;

the processing unit is further configured to determine, based on the latency level identifier of the second data and correspondences between memory pages of different types and latency level identifiers, that a memory page corresponding to the second data is the first memory page; and when the available capacity of the first memory page is insufficient to store the second data, the processing unit is further configured to: select the second memory page from memory pages included in the storage device, where a difference between read/write latency of the second memory page and read/write latency of the first memory page is less than a preset threshold; and write the second data to the second memory page.

In an optional implementation, the processing unit is further configured to: after storing the first data on the first memory page, when the latency level identifier of the first data is changed, migrate the first data from the first memory page to another memory page corresponding to a changed latency level identifier.

In an optional implementation, the processing unit is further configured to: before migrating the first data from the first memory page to the another memory page corresponding to the changed latency level identifier, monitor that a migration condition has been satisfied.

In an optional implementation, when a migration instruction corresponding to the first data is received, the processing unit is further configured to determine, based on the latency level identifier of the first data included in the migration instruction, whether the latency level identifier of the first data is changed.

In an optional implementation, the storage device is a solid-state drive (SSD).

According to a third aspect, an embodiment discloses a data storage apparatus. The apparatus is applied to a storage device, where the storage device includes at least a first memory page and a second memory page, the first memory page and the second memory page are of different types, memory pages of different types have different read/write latency, and the apparatus includes:

a processor, a memory, and a transceiver, where the memory is configured to store program instructions;

the transceiver is configured to receive and send data; and the processor is configured to invoke and execute the program instructions stored in the memory; and when the processor executes the program instructions, the apparatus is enabled to perform the method according to the first aspect.

According to a fourth aspect, an embodiment discloses a computer-readable storage medium. The computer-readable storage medium stores instructions. When the instructions are run on a computer, the computer is enabled to perform the method according to the first aspect.

According to a fifth aspect, an embodiment discloses a computer program product including an instruction. When the computer program product runs on an electronic device, the electronic device is enabled to perform the method according to the first aspect.

According to the data storage method disclosed in the embodiments, data can be stored based on different read/write latency of various memory pages included in the storage device. In other words, in the solutions disclosed in the embodiments, differences between the read/write latency of the various memory pages in the storage device are used to implement hierarchical storage of data. In an existing hierarchical storage system, at least two storage devices with different read/write latency need to be configured. However, by using the solutions in the embodiments, only one storage device needs to be configured in a hierarchical storage system to implement hierarchical storage, thereby resolving the problem that the configuration of the existing hierarchical storage system is relatively complex.

Further, in the existing hierarchical storage system, storage devices having different read/write latency are connected to a processor in the hierarchical storage system by using a same interface card. However, different storage devices may have different requirements on the interface card. Therefore, compatibility processing further needs to be performed on the interface card to connect each storage device to the processor.

In the solutions disclosed in the embodiments, only one storage device needs to be configured. Therefore, compatibility processing does not need to be performed on the interface card, thereby further simplifying a configuration manner of the hierarchical storage system.

BRIEF DESCRIPTION OF DRAWINGS

To describe the solutions more clearly, the following briefly describes the accompanying drawings required for describing the embodiments. It is clear that persons of ordinary skill in the art may derive other drawings from these accompanying drawings without creative efforts.

DETAILED DESCRIPTION OF THE EMBODIMENTS

To resolve a problem that a configuration of a hierarchical storage system is relatively complex because at least two storage devices having different read/write latency need to be configured in an existing hierarchical storage system, embodiments disclose a data storage method and apparatus.

The embodiments disclose a data storage method. The data storage method is applied to a storage device, where the storage device includes at least a first memory page and a second memory page, the first memory page and the second memory page are of different types, and memory pages of different types have different read/write latency. In addition, the storage device is further connected to a processor in a hierarchical storage system by using an interface card. The processor may be a central processing unit (CPU) or may be another component having a processing function. This is not limited.

In the storage device, memory pages of different types have different read/write latency. Therefore, in the embodiments, data having different requirements on a storage speed may be stored on different memory pages in a same storage device.

In addition, in a memory, a main control chip of the memory is further configured. The data storage method disclosed in the embodiments may be applied to the main control chip.

Figure 1:
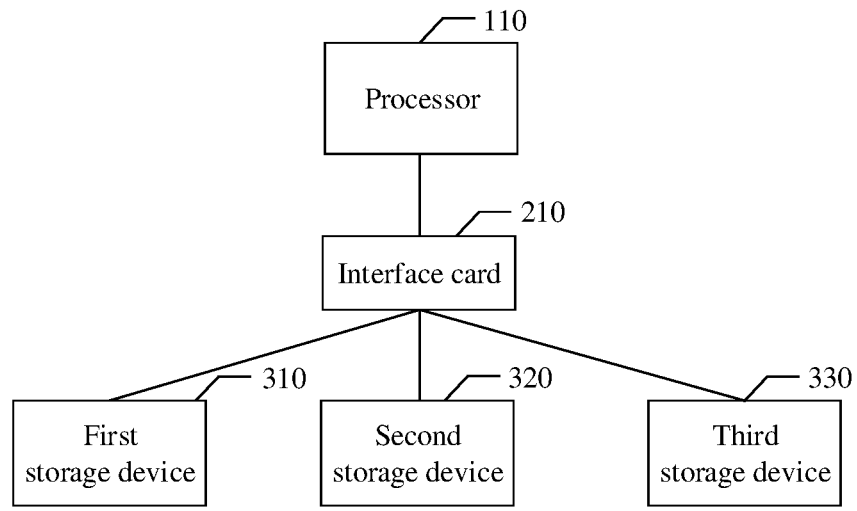
FIG. 1 is a schematic diagram of a hierarchical storage system disclosed in an existing technology.
Figure 2:
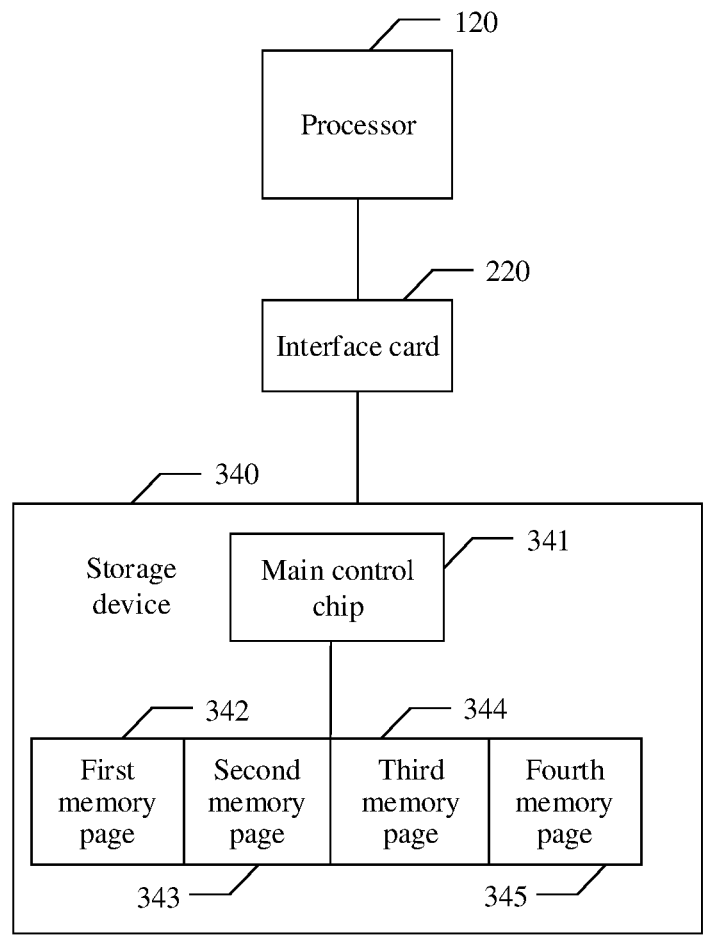
FIG. 2 is a schematic diagram of a hierarchical storage system to which a data storage method according to an embodiment.

To clarify the solutions provided in the embodiments, the embodiments disclose FIG. 2. FIG. 2 is a hierarchical storage system to which the method disclosed in the embodiments is applied. The hierarchical storage system includes a processor 120 and an interface card 220. In addition, the hierarchical storage system further includes a storage device 340. The storage device 340 can perform the data storage method disclosed in the embodiments.

The storage device 340 is connected to the processor 120 by using the interface card 220. In addition, the storage device 340 includes at least two memory pages having different read/write latency. In FIG. 2, different types of memory pages included in the storage device 340 are a first memory page 342, a second memory page 343, a third memory page 344, and a fourth memory page 345. The first memory page 342, the second memory page 343, the third memory page 344, and the fourth memory page 345 each have different read/write latency. In addition, the storage device 340 further includes a main control chip 341. When storing data, the storage device 340 implements hierarchical storage on the data according to the solutions disclosed in the embodiments and based on differences between read/write latency of various memory pages included in the storage device 340.

In a feasible example, the storage device 340 is a solid-state drive (SSD). When a storage particle of the SSD is four bits per cell (QLC), the SSD usually includes four types of memory pages. The four types of memory pages are an LP (lower page), an UP (upper page), an XP (extra page), and a TP (top page). In this case, the first memory page 342, the second memory page 343, the third memory page 344, and the fourth memory page 345 are respectively the LP, the UP, the XP, and the TP.

Read/write latency of the LP is approximately 56 μs, read/write latency of the UP is approximately 82 μs, read/write latency of the XP is approximately 135 μs, and read/write latency of the TP is approximately 241 μs, that is, the four types of memory pages each have different read/write latency. In this case, the SSD may store data with different requirements on the storage speed to the memory pages with different read/write latency by using the data storage method disclosed in the embodiments.

In addition, the storage device 340 may alternatively be an SSD with another storage particle, for example, may be an SSD with a storage particle of a trinary-level cell (TLC). Further, the storage device 340 may alternatively be another storage device including at least two memory pages having different read/write latency. This is not limited in the embodiments.

Figure 3:
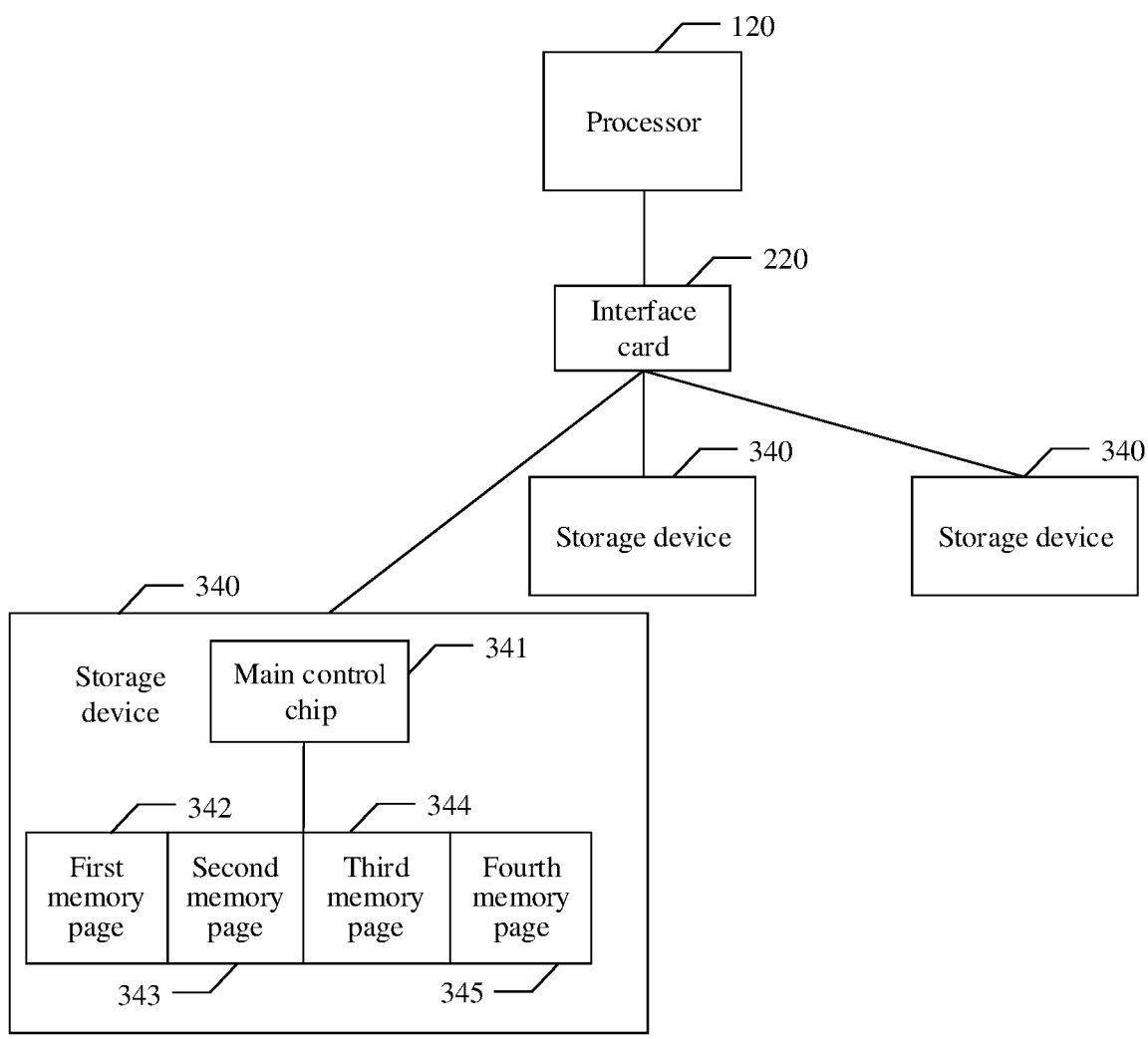
FIG. 3 is a schematic diagram of a hierarchical storage system to which a data storage method according to an embodiment.

Further, when a hierarchical storage device needs to have a larger storage capacity, a plurality of storage devices 340 may be configured, referring to FIG. 3. The plurality of storage devices 340 are of a same type. In addition, the plurality of storage devices 340 are all connected to the processor 120 by using the interface card 220 and can store data according to the solutions disclosed in the embodiments.

When data needs to be stored, the processor 120 transmits to-be-stored data and a latency level identifier of the to-be-stored data to a storage device 340 having a sufficient available capacity. For example, in a feasible implementation, when determining that data needs to be stored, the processor 120 may sequentially determine, based on a preset number, whether each storage device 340 has sufficient storage space. After determining that a storage device 340 has sufficient storage space, the processor 120 transmits the to-be-stored data and the latency level identifier of the to-be-stored data to the storage device 340, so that the storage device 340 can implement hierarchical storage of data according to the data storage method.

In this case, in a feasible example, each storage device 340 is an SSD, and the SSD includes four memory pages: the LP, the UP, the XP, and the TP. Further, each storage device 340 may alternatively be an SSD with another storage particle, for example, may be an SSD with a storage particle of a trinary-level cell (TLC). Further, the storage device 340 may alternatively be another storage device including at least two memory pages having different read/write latency. This is not limited in the embodiments.

Figure 4:
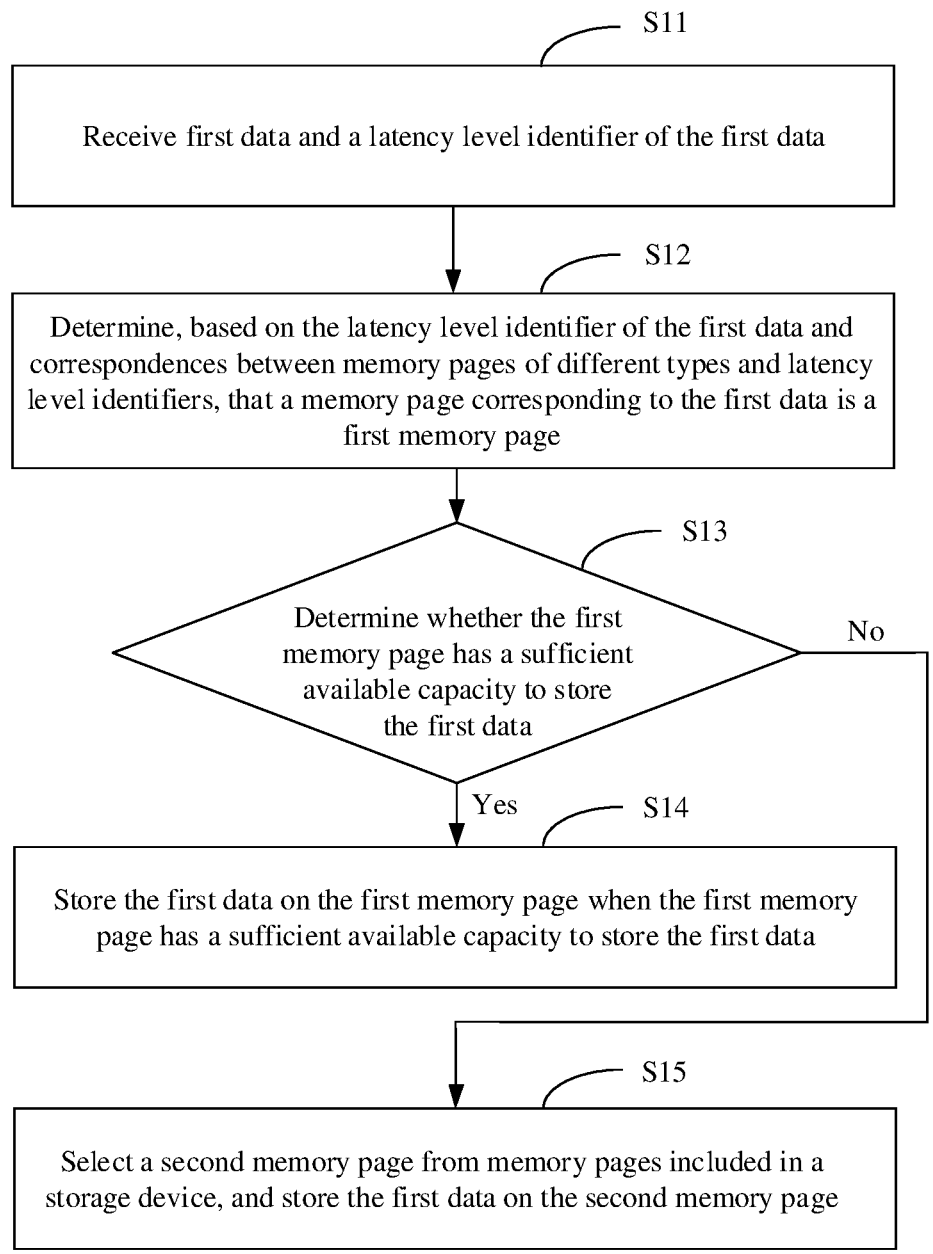
FIG. 4 is a schematic diagram of a working procedure of a data storage method according to an embodiment.

The following describes the data storage method disclosed in the embodiments with reference to a working procedure. FIG. 4 is a schematic diagram of a working procedure of a data storage method according to an embodiment. The method shown in FIG. 4 may be applied to the storage device included in FIG. 2 or FIG. 3. The storage device may be an SSD or may be another storage device including at least two memory pages having different read/write latency.

Referring to FIG. 4, the data storage method disclosed in this embodiment includes the following steps.

Step S11: Receive first data and a latency level identifier of the first data, where the latency level identifier of the first data is used to indicate a requirement level of the first data for read/write latency.

The first data and the latency level identifier of the first data may be transmitted by a processor in a hierarchical storage system to the storage device.

In this embodiment, the processor in the hierarchical storage system can determine a requirement level of data for read/write latency based on a factor such as data popularity. Generally, when popularity of data is relatively high, it is considered that the data has a relatively high requirement on the read/write latency, and the data needs to be stored on a memory page having a relatively low read/write latency. Correspondingly, the processor determines that the data has a relatively high requirement on the read/write latency. If popularity of to-be-stored data is relatively low, it is considered that the data has a relatively low requirement on the read/write latency. To reduce occupation of a memory page having low read/write latency, the data is usually stored on a memory page having relatively high read/write latency. Correspondingly, the processor determines that the data has a relatively low requirement level for the read/write latency.

In addition, after determining a requirement level of data for the read/write latency, the processor may generate a corresponding latency level identifier, and transmit the data and the latency level identifier of the data to the storage device.

In a transmission process, the processor may encapsulate the data and the latency level identifier of the data into one data packet and transmit the data packet to the storage device; or may separately transmit the data and the latency level identifier corresponding to the data to the storage device by using two pieces of information.

Step S12: Determine, based on the latency level identifier of the first data and correspondences between memory pages of different types and latency level identifiers, that a memory page corresponding to the first data is the first memory page.

In this embodiment, the correspondences between memory pages of different types in the storage device and latency level identifiers are preset. In the correspondences, a latency level identifier corresponding to a memory page having lower read/write latency indicates a higher requirement level for the read/write latency, so that data having a higher requirement level for the read/write latency is stored on the memory page having low read/write latency, and data having a lower requirement level for the read/write latency is stored on the memory page having high read/write latency.

In an example, the storage device is an SSD, and a storage particle of the SSD is a QLC. In this case, the storage device includes four types of memory pages: the LP, the UP, the XP, and the TP; and read/write latency of the four types of memory pages sequentially increases.

In this case, there may be four latency level identifiers. Correspondences between memory pages of different types and latency level identifiers may be shown in the following table:

| Memory page | Latency level identifier |
|---|---|
| LP | 1 |
| UP | 2 |
| XP | 3 |
| TP | 4 |

In the foregoing table, the latency level identifiers include 1 to 4, and requirement levels of corresponding first data for the read/write latency sequentially decrease. That is, when the requirement level of the first data for the read/write latency is the highest, the processor determines that the latency level identifier of the first data is 1. After receiving the first data and the latency level identifier of the first data, the storage device may determine, based on the foregoing table, that the first memory page of the first data is the LP.

Step S13: Determine whether the first memory page has a sufficient available capacity to store the first data; and when the first memory page has a sufficient available capacity to store the first data, perform an operation of step S14; when the first memory page does not have a sufficient available capacity to store the first data, perform an operation of step S15.

In other words, whether remaining storage space in the first memory page is less than a capacity occupied by the first data is detected. When the remaining storage space in the first memory page is not less than the capacity occupied by the first data, it indicates that the available capacity of the first memory page is sufficient to store the first data.

Step S14: Store the first data on the first memory page when the first memory page has a sufficient available capacity to store the first data.

Step S15: When the available capacity of the first memory page is insufficient to store the first data, select a second memory page from memory pages included in the storage device, and store the first data on the second memory page, where a difference between read/write latency of the second memory page and read/write latency of the first memory page is less than a preset threshold.

The preset threshold is determined based on read/write latency of various memory pages. The smallest value in differences between the read/write latency of the various memory pages in the storage device is set to a first difference, and the largest value in the differences between the read/write latency of the various memory pages is set to a second difference. In this case, the preset threshold may be a value between the first difference and the second difference.

Through the foregoing steps, the first data can be preferably stored on the first memory page corresponding to the latency level identifier; and when the available capacity of the first memory page is insufficient, the first data is stored on another memory page.

According to the data storage method disclosed in this embodiment, the first data and the latency level identifier of the first data can be obtained. Then, the first memory page corresponding to the latency level identifier is determined based on the correspondences between memory pages of different types and latency level identifiers. When the available capacity of the first memory page is sufficient, the first data is stored on the first memory page. When the available capacity of the first memory page is insufficient to store the first data, another memory page is selected from the memory pages included in the storage device to store the first data on the another memory page in the storage device.

In other words, according to the data storage method disclosed in this embodiment, data can be stored based on different read/write latency of various memory pages included in the storage device. In other words, in the solution disclosed in this embodiment, differences between the read/write latency of the various memory pages in the storage device are used to implement hierarchical storage of data. In an existing hierarchical storage system, at least two storage devices with different read/write latency need to be configured. However, by using the solutions in the embodiments, only one storage device needs to be configured in a hierarchical storage system to implement hierarchical storage, thereby resolving the problem that the configuration of the existing hierarchical storage system is relatively complex.

Further, in the existing hierarchical storage system, storage devices having different read/write latency are connected to a processor in the hierarchical storage system by using a same interface card. However, different storage devices may have different requirements on the interface card. Therefore, compatibility processing further needs to be performed on the interface card to connect each storage device to the processor to obtain the hierarchical storage system.

In the solutions disclosed in the embodiments, only one storage device needs to be configured. Therefore, compatibility processing does not need to be performed on the interface card, thereby further simplifying a configuration manner of the hierarchical storage system.

In addition, in step S15, the operation of selecting the second memory page from the memory pages included in the storage device when the available capacity of the first memory page is insufficient to store the first data is disclosed. In this embodiment, the storage device may determine the second memory page in a plurality of manners.

When the storage device includes a plurality of memory pages and differences between read/write latency of the plurality of memory pages and the read/write latency of the first memory page are less than the preset threshold, any memory page may be selected from the plurality of memory pages as the second memory page, or a memory page having highest read/write latency is selected from the plurality of memory pages as the second memory page, so that other data is stored on a memory page having low read/write latency. Another manner may alternatively be used. This is not limited in this embodiment.

Alternatively, in another feasible implementation, when the available capacity of the first memory page is insufficient to store the first data, the storage device may first search memory pages whose read/write latency is higher than that of the first memory page for the second memory page. In this case, when an available capacity of at least one memory page is sufficient to store the first data in the memory pages whose read/write latency is higher than that of the first memory page and a difference between read/write latency of the at least one memory page and the read/write latency of the first memory page is less than the preset threshold, a memory page having highest read/write latency in the at least one memory page may be determined as the second memory page. When none of the memory pages whose read/write latency is higher than that of the first memory page is sufficient to store the first data, the memory pages whose read/write latency is lower than that of the first memory page are searched for the second memory page. In this case, when an available capacity of at least one memory page is sufficient to store the first data in the memory pages whose read/write latency is lower than that of the first memory page and a difference between read/write latency of the at least one memory page and the read/write latency of the first memory page is less than the preset threshold, a memory page having lowest read/write latency in the at least one memory page may be determined as the second memory page.

Figure 5:
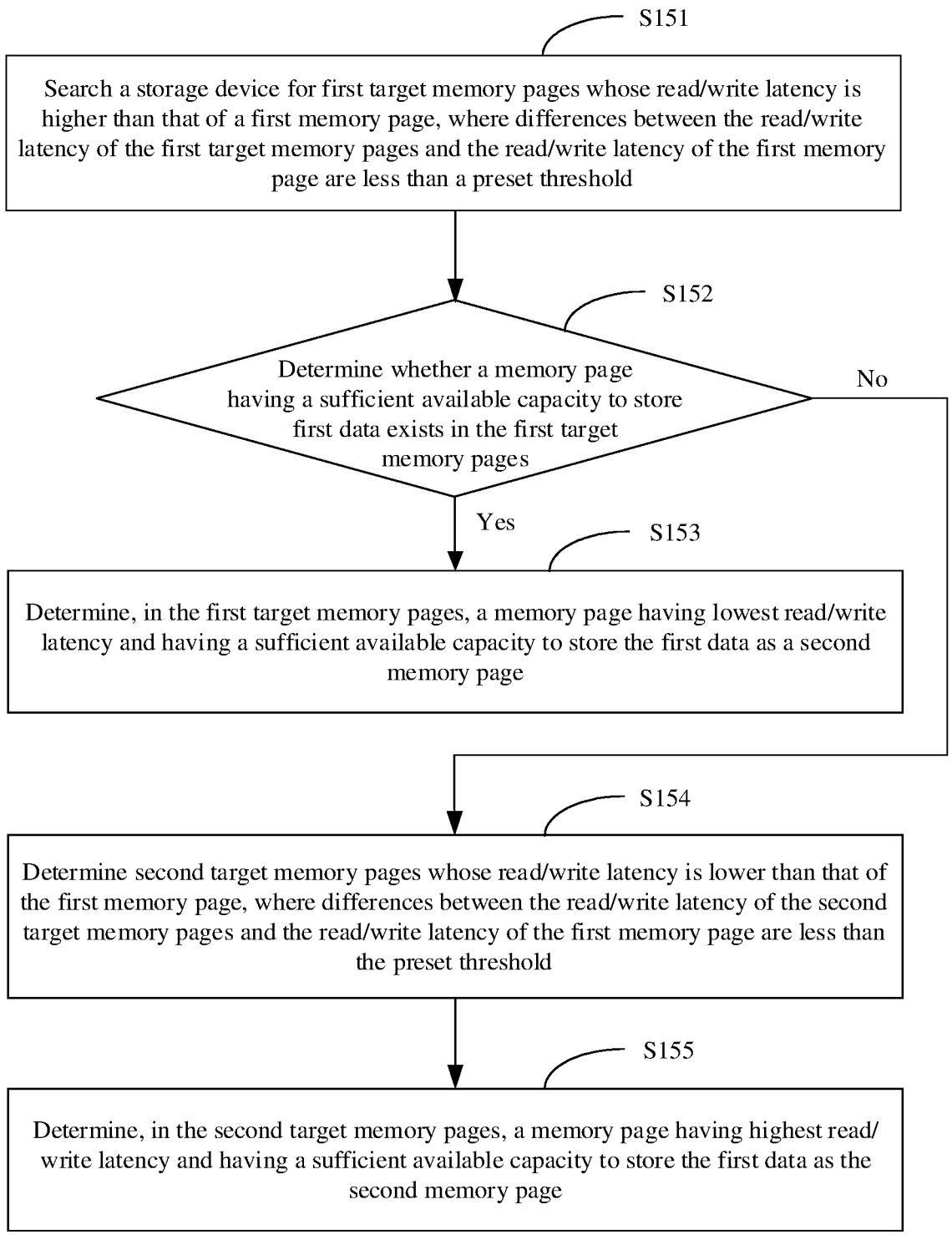
FIG. 5 is a schematic diagram of a working procedure of another data storage method according to an embodiment.

Referring to a schematic diagram of a working procedure shown in FIG. 5, in this embodiment, the second memory page may be selected from the memory pages included in the storage device through the following steps:

Step S151: Search the storage device for first target memory pages whose read/write latency is higher than that of the first memory page, where differences between the read/write latency of the first target memory pages and the read/write latency of the first memory page are less than the preset threshold.

Step S152: Determine whether a memory page having a sufficient available capacity to store the first data exists in the first target memory pages; and when the memory page having a sufficient available capacity to store the first data exists in the first target memory pages, perform an operation of step S153; when the memory page having a sufficient available capacity to store the first data does not exist in the first target memory pages, perform an operation of step S154.

Step S153: Determine, in the first target memory pages, a memory page having lowest read/write latency and having a sufficient available capacity to store the first data as the second memory page.

That is, in this embodiment, after the first target memory pages are determined, the memory page having the lowest read/write latency is determined as the second memory page in the first target memory pages having sufficient available capacities to store the first data. In addition, when none of the first target memory pages has a sufficient available capacity to store the first data, the operation of step S154 is performed.

Step S154: When no memory page having a sufficient available capacity to store the first data exists in the first target memory pages, determine second target memory pages whose read/write latency is lower than that of the first memory page, where differences between the read/write latency of the second target memory pages and the read/write latency of the first memory page are less than the preset threshold.

Step S155: Determine, in the second target memory pages, a memory page having highest read/write latency and having a sufficient available capacity to store the first data as the second memory page.

Through the operations of step S151 to step S155, when the available capacity of the first memory page is insufficient to store the first data, the second memory page is determined in the memory pages included in the storage device. In addition, when the second memory page is determined through the foregoing operations, the second memory page is preferably selected from the first target memory pages whose read/write latency is higher than that of the first memory page. The memory page having the lowest read/write latency is determined as the second memory page in the first target memory pages having sufficient available capacities to store the first data, where the differences between the read/write latency of the first target memory pages and the read/write latency of the first memory page are less than the preset threshold. In this way, the memory page whose read/write latency is slightly higher than that of the first memory page is preferably selected as the second memory page, in other words, the memory page whose read/write latency is higher than that of the first memory page and is relatively close to that of the first memory page is preferably selected as the second memory page, to ensure the read/write latency of the first data as low as possible.

In addition, when none of the first target memory pages has a sufficient available capacity to store the first data, the second memory page is selected from the second target memory pages whose read/write latency is lower than that of the first memory page. In this case, the memory page having the highest read/write latency is determined as the second memory page in the second target memory pages having sufficient available capacities to store the first data, where the differences between the read/write latency of the second target memory pages and the read/write latency of the first memory page are less than the preset threshold. In other words, the memory page whose read/write latency is lower than the first memory page and is relatively close to that of the first memory page is selected as the second memory page, to reduce occupation of a memory page having low read/write latency.

Further, in another embodiment, the steps are included:
  receiving second data and a latency level identifier of the second data, where the latency level identifier of the second data is used to indicate a requirement level of the second data for read/write latency;
  determining, based on the latency level identifier of the second data and correspondences between memory pages of different types and latency level identifiers, that a memory page corresponding to the second data is the first memory page;
  when the available capacity of the first memory page is insufficient to store the second data, selecting the second memory page from memory pages included in the storage device, where a difference between read/write latency of the second memory page and read/write latency of the first memory page is less than a preset threshold; and
  writing the second data to the second memory page.

Through the foregoing steps, the storage device can further implement hierarchical storage of the second data. When the first memory page corresponding to the latency level identifier of the second data is sufficient to store the second data, the second data is written to the first memory page. In addition, when the first memory page corresponding to the latency level identifier of the second data is insufficient to store the second data, the second memory page is determined, and the second data is written to the second memory page.

In the embodiments, the second memory page may be determined in the manner in the foregoing embodiment. Details are not described herein.

Further, popularity of a same piece of data stored in a storage device always changes. Therefore, data needs to be migrated based on the change in popularity. Data migration means that when a piece of data changes from data with high popularity to data with low popularity, the data is migrated from storage space having low read/write latency to storage space having high read/write latency to reduce occupation of the storage space having low read/write latency; and when a piece of data changes from data with low popularity to data with high popularity, the data is migrated from storage space having high read/write latency to storage space having low read/write latency to improve a read/write speed for the data when the data is subsequently used.

In the existing hierarchical storage system, the processor stores data with different popularity to different storage devices. In this case, when data needs to be migrated, the processor needs to migrate the to-be-migrated data from one storage device to another storage device. The processor may first read data in an original storage device, and then writes the read data to a target storage device, to migrate the data from the original storage device to the target storage device. That is, in the existing hierarchical storage system, during data migration, the processor needs to perform operations of reading data and writing data.

In the solutions, various data is stored on different memory pages in a same storage device. In this case, when data needs to be migrated, the processor transmits a corresponding migration instruction to the storage device, and the storage device receiving the migration instruction migrates the first data from the original memory page to the target memory page. In this process, the processor does not need to perform reading and writing operations but migrates data within the same storage device. Therefore, compared with the existing hierarchical storage system, the solutions in the embodiments can simplify data migration operations, improve data migration efficiency, and reduce occupation of the processor.

In this case, the data storage method disclosed in the another embodiment further includes the following operation:
  after storing the first data on the first memory page, when the latency level identifier of the first data is changed, migrating the first data from the first memory page to another memory page corresponding to a changed latency level identifier.

When detecting that data popularity changes, the processor usually generates a migration instruction, and transmits the migration instruction to the storage device. When the processor determines that the first data needs to be migrated, the migration instruction usually includes a latency level identifier of the first data, where the latency level identifier is a latency level identifier of the first data after the change in the popularity. For example, when the first data changes from data with high popularity to data with low popularity and needs to be migrated, the latency level identifier of the first data is a latency level identifier corresponding to the data with low popularity.

In this case, when the migration instruction corresponding to the first data is received, the storage device determines, based on the latency level identifier of the first data included in the migration instruction, whether the latency level identifier of the first data is changed.

Further, the processor may generate various forms of migration instructions based on a data migration requirement.

In a feasible implementation, the processor may generate a first migration instruction. For example, in a scenario in which popularity of data changes relatively fast, the processor usually generates the first migration instruction, where the first migration instruction is used to instruct the storage device to migrate the first data as soon as possible.

In this case, the first migration instruction usually includes a current address of the first data and the latency level identifier of the first data. The first migration instruction includes the current address of the first data, so that the storage device determines the first data based on the current address. In addition, the first migration instruction further includes the latency level identifier of the first data, so that the storage device determines a target memory page based on the latency level identifier. The latency level identifier of the first data is the latency level identifier of the first data after the change in the popularity.

In this case, the storage device determines the first data based on the current address in the first migration instruction; and determines, based on the latency level identifier of the first data included in the first migration instruction, a destination address to which the first data is to be migrated.

In an example, the storage device determines, based on the latency level identifier of the first data included in the first migration instruction and the correspondences between memory pages of different types and latency level identifiers, that a memory page corresponding to the first data is another memory page, that is, the first data needs to be migrated from the first memory page to the another memory page. In this case, the storage device determines whether an available capacity of the another memory page is sufficient to store the first data; when the available capacity of the another memory page is sufficient to store the first data, migrates the first data to the another memory page; when the available capacity of the another memory page is insufficient to store the first data, selects a third memory page from memory pages included in the storage device, where a difference between read/write latency of the third memory page and read/write latency of the another memory page is less than the preset threshold; and then, migrates the first data to the third memory page.

Further, before the first data is migrated from the first memory page to the another memory page corresponding to the changed latency level identifier, whether the another memory page has a sufficient available capacity to store the first data may further be determined. When the another memory page has a sufficient available capacity to store the first data, the first data is migrated from the first memory page to the another memory page; when the another memory page does not have a sufficient available capacity to store the first data, the third memory page is usually selected from the memory pages included in the storage device, where the difference between the read/write latency of the third memory page and the read/write latency of the first memory page is less than the preset threshold. Then, the first data is migrated to the third memory page.

When the storage device includes a plurality of memory pages and differences between read/write latency of the plurality of memory pages and the read/write latency of the another memory page are less than the preset threshold, any memory page may be selected from the plurality of memory pages as the third memory page, or a memory page having highest read/write latency is selected from the plurality of memory pages as the third memory page, so that other data is stored on a memory page having low read/write latency. Another manner may alternatively be used. This is not limited in this embodiment.

Alternatively, in another feasible implementation, when the available capacity of the another memory page is insufficient to store the first data, the storage device may first search memory pages whose read/write latency is higher than that of the another memory page for the third memory page. In this case, when an available capacity of at least one memory page is sufficient to store the first data in the memory pages whose read/write latency is higher than that of the another memory page and a difference between read/write latency of the at least one memory page and the read/write latency of the another memory page is less than the preset threshold, a memory page having highest read/write latency in the at least one memory page may be determined as the third memory page. When none of the memory pages whose read/write latency is higher than that of the another memory page is sufficient to store the first data, the memory pages whose read/write latency is lower than that of the first memory page are searched for the third memory page. In this case, when an available capacity of at least one memory page is sufficient to store the first data in the memory pages whose read/write latency is lower than that of the another memory page and a difference between read/write latency of the at least one memory page and the read/write latency of the another memory page is less than the preset threshold, a memory page having lowest read/write latency in the at least one memory page may be determined as the third memory page.

In the foregoing embodiment, the operation of how to migrate data when the storage device receives the first migration instruction is disclosed. In addition, in some application scenarios, when popularity of data changes, but the data does not need to be migrated immediately, a migration condition may be preset. Before the first data is migrated from the first memory page to the another memory page corresponding to the changed latency level identifier, the storage device monitors whether the migration condition has been satisfied. When the storage device monitors that the migration condition has been satisfied, the storage device performs a migration operation.

Figure 6:
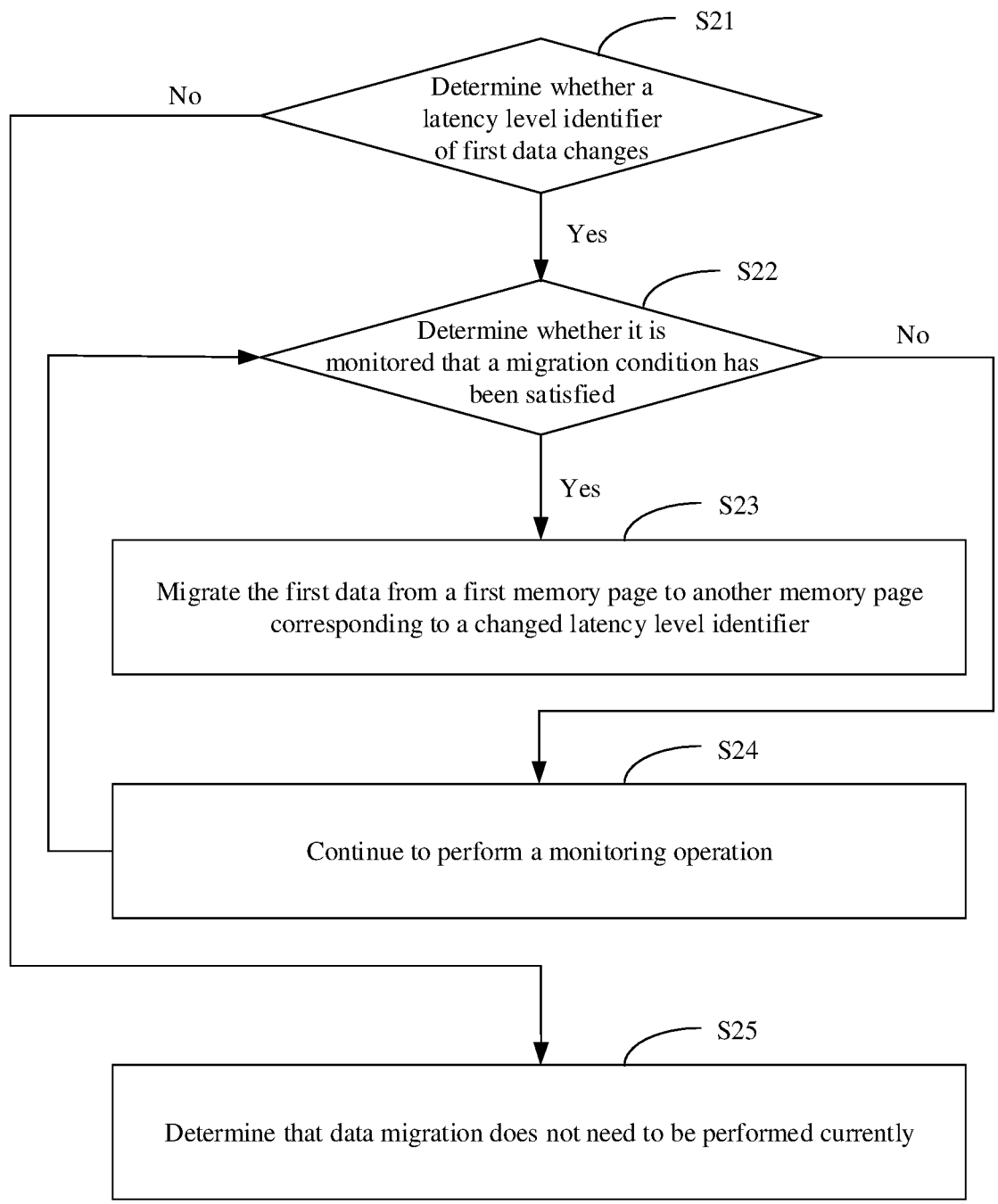
FIG. 6 is a schematic diagram of a working procedure of another data storage method according to an embodiment.

In this case, referring to a schematic diagram of a working procedure shown in FIG. 6, in this embodiment, the following steps are included:

Step S21: When a migration instruction corresponding to the first data is received, determine, based on the latency level identifier of the first data included in the migration instruction, whether the latency level identifier of the first data is changed; and when the latency level identifier of the first data is changed, perform an operation of step S22; when the latency level identifier of the first data is not changed, perform an operation of step S25.

In this case, the received migration instruction is usually a second migration instruction. When the processor determines that popularity of the first data changes, but the first data does not need to be migrated immediately, the processor may generate a second migration instruction, and transmit the second migration instruction to the storage device.

Step S22: Determine whether it is monitored that the migration condition has been satisfied; and when it is monitored that the migration condition has been satisfied, perform an operation of step S23; when it is monitored that the migration condition has not been satisfied, perform an operation of step S24.

Step S23: When it is monitored that the migration condition has been satisfied, migrate the first data from the first memory page to another memory page corresponding to a changed latency level identifier.

Step S24: Continue to perform a monitoring operation and return to the operation of step S22.

Step S25: When it is determined that the latency level identifier of the first data is not changed, determine that data migration does not need to be performed currently.

In this embodiment, when receiving the second migration instruction, the storage device does not perform data migration immediately, but performs data migration after the migration trigger condition is satisfied. In a process of waiting for satisfaction of the migration trigger condition, a data migration event may still occur sometimes. In this case, other to-be-migrated data and the first data may be migrated together, thereby reducing a quantity of times of data migration and simplifying a migration trigger process.

In this case, the processor usually generates the second migration instruction. The second migration instruction usually includes the current address of the first data and the latency level identifier of the first data, where the latency level identifier is the latency level identifier of the first data after the change in the popularity.

Further, the second migration instruction may further include the migration condition, so that the storage device migrates the first data when monitoring that the migration condition has been satisfied. Alternatively, the storage device may preset the migration condition.

There are a plurality of types of migration conditions. In a feasible implementation, when the storage device performs a garbage collection operation, it is determined that the migration condition is satisfied; or when a time difference between a current time and a first time is not less than first preset duration, it is determined that the migration condition is satisfied, where the first time is a time at which the latency level identifier of the first data changes; when the storage device migrates other data, it is determined that the migration condition is satisfied; or the foregoing migration conditions may be randomly combined.

Garbage collection (GC) is an automatic memory management mechanism, whether a specified memory area needs to be released may be automatically determined, and the specified memory area is securely released to achieve an objective such as resource cleanup.

In this embodiment, it may be set that when the storage device needs to perform garbage collection, it is determined that the migration trigger condition is satisfied, so that data is migrated in a garbage collection process. However, in the garbage collection process, garbage data that needs to be collected often needs to be migrated to storage space, and then various garbage data that is migrated to the storage space is cleaned. In this case, in a process of migrating the garbage data, the first data may be migrated together, thereby reducing a quantity of times of data migration.

In addition, in this embodiment, the storage device may further set the first preset duration, or the second migration instruction includes the first preset duration. In this case, when the time difference between the current time and the first time is not less than the first preset duration, it is determined that the migration condition is satisfied. In a period of time from the time at which the second migration instruction is obtained to the time at which the time difference reaches the first preset duration, another data migration event that needs to be performed may occur. In this case, data migration may be performed together, thereby reducing the quantity of times of data migration.

The first time is a time at which it is determined that the latency level identifier of the first data is changed. After receiving the second migration instruction, the storage device determines, based on the latency level identifier of the first data included in the second migration instruction, whether a latency level of the first data is changed. When determining that the latency level identifier of the first data is changed, the storage device uses the time of determining that the latency level identifier of the first data is changed as the first time. Alternatively, in another feasible manner, the storage device may determine a time of receiving the second migration instruction as the first time.

Alternatively, when the storage device migrates other data, it may be determined that the migration condition is satisfied, so that the first data and the other data can be migrated together, thereby reducing the quantity of times of data migration.

In addition, in this embodiment, when the first data is migrated, the first data may be migrated from the first memory page to another memory page corresponding to the changed latency level identifier. Further, before migration, it may further be determined whether an available capacity of the another memory page is sufficient to store the second data; and when the available capacity of the another memory page is sufficient to store the second data, the first data is migrated to the another memory page; when the available capacity of the another memory page is insufficient to store the second data, a third memory page is selected from the memory pages included in the storage device, where an available capacity of the third memory page is sufficient to store the first data, and a difference between read/write latency of the third memory page and the read/write latency of the first memory page is less than the preset threshold.

For a manner of determining the third memory page, refer to the foregoing embodiment. Details are not described herein again.

In the foregoing embodiment, the operation of how to migrate data when the storage device receives the second migration instruction is disclosed. In addition, in some application scenarios, a migration condition in another form may be preset. Before the first data is migrated from the first memory page to the another memory page corresponding to the changed latency level identifier, the storage device monitors whether the migration condition in the another form has been satisfied. When the storage device monitors that the migration condition in the another form has been satisfied, the storage device performs a migration operation.

In this case, the migration instruction received by the storage device is usually a third migration instruction. When the processor determines that popularity of the first data changes, but the first data does not need to be migrated immediately, the processor may generate a third migration instruction, and transmit the third migration instruction to the storage device.

In addition, in this embodiment, when the time difference between the current time and the first time is less than second preset duration and the storage device performs a garbage collection operation, it is determined that the migration condition is satisfied, where the first time is a time at which it is determined that the latency level identifier of the first data is changed.

When the time difference between the current time and the first time is not less than the second preset duration and the first memory page stores the first data, it is determined that the migration condition is satisfied.

The third migration instruction usually includes the current address of the first data and the latency level identifier of the first data, where the latency level identifier is the latency level identifier of the first data after the change in the popularity.

Further, the third migration instruction may further include the migration condition, so that the storage device migrates the first data when monitoring that the migration condition has been satisfied. Alternatively, the storage device may preset the foregoing migration condition.

In addition, in this embodiment, the storage device may alternatively set the second preset duration, or the third migration instruction includes the second preset duration, so that the storage device determines, based on the second preset duration, whether the migration condition is satisfied.

The first time is a time at which it is determined that the latency level identifier of the first data is changed. In another feasible manner, the storage device may alternatively determine a time of receiving the third migration instruction as the first time.

Figure 7:
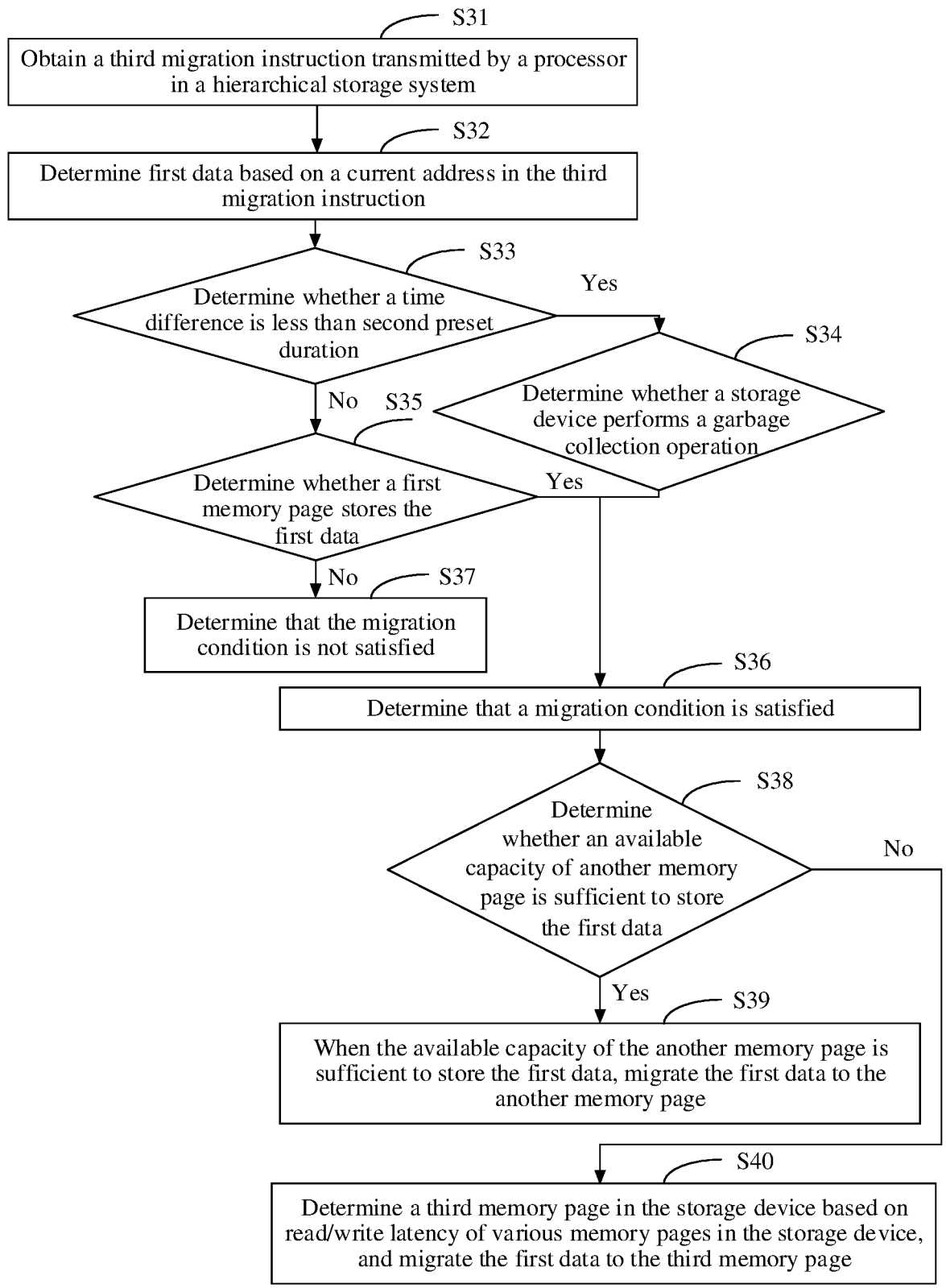
FIG. 7 is a schematic diagram of a working procedure of another data storage method according to an embodiment.

In the foregoing embodiment, the migration condition in the another form is disclosed. To clarify a manner of implementing data migration based on the migration condition, referring to a schematic diagram of a working procedure shown in FIG. 7, the example includes the following steps.

Step S31: Obtain a third migration instruction transmitted by a processor in a hierarchical storage system.

The third migration instruction includes: storing a current address of first data and a latency level identifier of the first data, where the latency level identifier is a latency level identifier of the first data after a change in popularity.

Step S32: Determine the first data based on the current address in the third migration instruction.

Step S33: Determine whether a time difference between a current time and a first time is less than second preset duration; and when the time difference between the current time and the first time is less than the second preset duration, determine that the migration condition is satisfied, and perform an operation of step S34; when the time difference between the current time and the first time is not less than the second preset duration, perform an operation of step S35.

The first time is a time at which it is determined that the latency level identifier of the first data is changed. In addition, in this embodiment, the storage device may further set the second preset duration, or the third migration instruction includes the second preset duration.

Step S34: Determine whether the storage device performs a garbage collection operation; and when the storage device performs the garbage collection operation, perform an operation of step S36; when the storage device does not perform the garbage collection operation, return to the operation of step S33.

Step S35: When the time difference between the current time and the first time is not less than the second preset duration, determine whether the first memory page stores the first data; and when the first memory page stores the first data, perform the operation of step S36; when the first memory page does not store the first data, perform an operation of step S37.

Step S36: Determine that the migration condition is satisfied, and perform an operation of step S38.

Step S37: Determine that the migration condition is not satisfied.

Step S38: Determine whether an available capacity of another memory page corresponding to the latency level identifier is sufficient to store the first data; and when the available capacity of the another memory page corresponding to the latency level identifier is sufficient to store the first data, perform an operation of step S39; when the available capacity of the another memory page corresponding to the latency level identifier is insufficient to store the first data, perform an operation of step S40.

Step S39: When the available capacity of the another memory page is sufficient to store the first data, migrate the first data to the another memory page.

Step S40: When the available capacity of the another memory page is insufficient to store the first data, determine a third memory page in the storage device based on read/write latency of various memory pages in the storage device, and migrate the first data to the third memory page.

In the embodiments, the third memory page may be determined in the manner disclosed in the foregoing embodiment. Details are not described herein.

In this embodiment, when the time difference between the current time and the first time is less than the second preset duration, when the storage device performs a garbage collection event, it is determined that data migration needs to be performed. In this case, garbage collection and data migration may be performed together, thereby reducing a quantity of times of data migration. In addition, when the time difference between the current time and the first time is not less than the second preset duration, when the first memory page still stores the first data, that is, the first data on the first memory page has not been migrated, data migration is performed, thereby ensuring that data migration can be implemented.

A data storage method is disclosed by using the foregoing embodiments. A storage device to which the data storage method is applied may be in a plurality of forms.

In a feasible implementation, the storage device is an SSD. The SSD includes the following types of storage particles: a single-level cell (SLC), a multi-level cell (MLC), a trinary-level cell (TLC), and a quad-level (QLC). The storage device may be an SSD whose storage particle is a QLC. In this case, memory pages of the storage device include an LP, a UP, an XP, and a TP.

In this case, there may be four types of latency level identifiers. In correspondences between memory pages of different types and latency level identifiers, a memory page corresponding to a latency level identifier having a highest requirement level for read/write latency is the LP, a memory page corresponding to a latency level identifier having a relatively high requirement level for the read/write latency is the UP, a memory page corresponding to a latency level identifier having a relatively low requirement level on the read/write latency is the XP, and a memory page corresponding to a latency level identifier having a lowest requirement level on the read/write latency is the TP. Hierarchical data storage can be implemented based on read/write latency of different memory pages in the SSD.

Further, the storage device may alternatively be an SSD with another storage particle, for example, may be an SSD with a storage particle of a trinary-level cell (TLC). Further, the storage device may alternatively be another storage device including at least two memory pages having different read/write latency. This is not limited in the embodiments.

In another embodiment, a data storage method is further disclosed. The method is applied to a processor, the processor is connected to a storage device, the storage device includes at least a first memory page and a second memory page, the first memory page and the second memory page are of different types, and memory pages of different types have different read/write latency.

The processor is disposed in a hierarchical storage system and is usually connected to the storage device by using an interface card.

Figure 8:
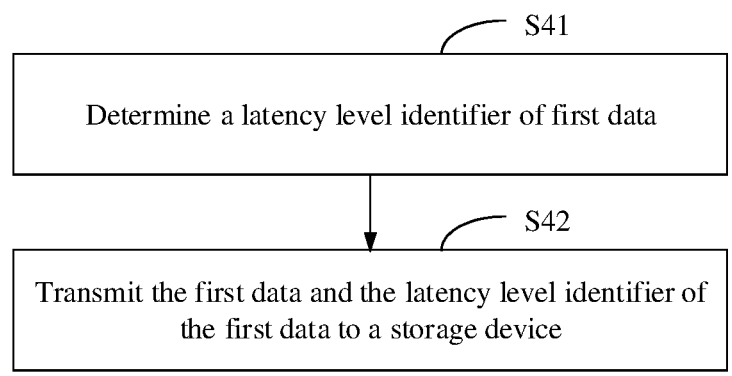
FIG. 8 is a schematic diagram of a working procedure of another data storage method according to an embodiment.

Referring to a schematic diagram of a working procedure shown in FIG. 8, the data storage method disclosed in this embodiment includes the following steps.

Step S41: Determine a latency level identifier of first data, where the latency level identifier is used to indicate a requirement level of the first data for read/write latency.

The processor can determine, based on a factor such as popularity of the first data, a requirement level of the first data for the read/write latency, to determine the latency level identifier of the first data.

Generally, when the popularity of the first is relatively high, it is considered that the first data has a relatively high requirement on the read/write latency, and the first data needs to be stored on a memory page having a relatively low read/write latency. Correspondingly, the processor determines that the first data has a relatively high requirement on the read/write latency. When the popularity of the first data is relatively low, the first data has a relatively low requirement on the read/write latency. To reduce occupation of a memory page having low read/write latency, the first data is usually stored on a memory page having relatively high read/write latency. The processor determines that the first data has a relatively low requirement level for the read/write latency.

Step S42: Transmit the first data and the latency level identifier of the first data to the storage device.

When transmitting the first data and the latency level identifier to the storage device, the processor may encapsulate the first data and the latency level identifier into one data packet and transmit the data packet to the storage device; or may separately transmit the first data and the latency level identifier to the storage device by using two pieces of information.

After obtaining the first data and the latency level identifier, the storage device determines, based on the latency level identifier and the correspondences between memory pages of different types and latency level identifiers, a memory page corresponding to the first data, and stores the first data on the memory page.

By using the data storage method disclosed in this embodiment, the processor stores the determined latency level identifier of the first data and transmits the first data and the latency level identifier to the storage device, so that the storage device stores the first data on the corresponding memory page based on the latency level identifier, thereby implementing hierarchical storage of data. In an existing hierarchical storage system, at least two storage devices with different read/write latency need to be configured. However, by using the solutions in the embodiments, only one storage device needs to be configured in a hierarchical storage system to implement hierarchical storage, thereby resolving the problem that the configuration of the existing hierarchical storage system is relatively complex.

Further, in the existing hierarchical storage system, storage devices having different read/write latency are connected to a processor in the hierarchical storage system by using a same interface card. However, different storage devices may have different requirements on the interface card. Therefore, compatibility processing further needs to be performed on the interface card to connect each storage device to the processor.

However, in the embodiments, only one storage device needs to be configured. Therefore, compatibility processing does not need to be performed on the interface card, thereby further simplifying a configuration manner of the hierarchical storage system.

In addition, popularity of a same piece of data stored in a storage device always changes. Therefore, data needs to be migrated based on the change in popularity. Data migration means that when a piece of data changes from data with high popularity to data with low popularity, the data is migrated from storage space having low read/write latency to storage space having high read/write latency to reduce occupation of the storage space having low read/write latency; and when a piece of data changes from data with low popularity to data with high popularity, the data is migrated from storage space having high read/write latency to storage space having low read/write latency to improve a read/write speed for the data when the data is subsequently used.

In this case, in this embodiment, the following steps are included:

generating, based on the change in the popularity of the first data in the storage device, a migration instruction corresponding to the first data; and transmit, to the storage device, the migration instruction corresponding to the first data.

In addition, there may be a plurality of types of migration instructions. In a feasible implementation, the migration instruction corresponding to the first data is a first migration instruction, a second migration instruction, or a third migration instruction. Each migration instruction includes: storing a current address of the first data and the latency level identifier of the first data, where the latency level identifier is a latency level identifier corresponding to the first data after the change in popularity.

In a scenario in which popularity of data changes relatively fast, the processor generates the first migration instruction.

In addition, when data popularity changes, but data migration does not need to be performed immediately, a memory controller often generates the second migration instruction or the third migration instruction.

After receiving the migration instruction, the storage device migrates the first data based on the migration instruction.

In the existing hierarchical storage system, the processor stores data with different popularity to different storage devices. In this case, when data needs to be migrated, the processor needs to migrate the to-be-migrated data from one storage device to another storage device. The processor may first read data in an original storage device, and then writes the read data to a target storage device, to migrate the data from the original storage device to the target storage device. That is, in the existing hierarchical storage system, during data migration, the processor needs to perform operations of reading data and writing data.

In the solutions, various data is stored on different memory pages in a same storage device. In this case, when data needs to be migrated, the processor transmits a corresponding migration instruction to the storage device, and the storage device receiving the migration instruction migrates the first data from the original memory page to the target memory page. In this process, the processor does not need to perform reading and writing operations but migrates data within the same storage device. Therefore, compared with the existing hierarchical storage system, the solutions in the embodiments can simplify data migration operations, improve data migration efficiency, and reduce occupation of the processor.

The following shows apparatus embodiments, which may be used to perform the method embodiments. For details not disclosed in the apparatus embodiments, refer to the method embodiments.

Figure 9:
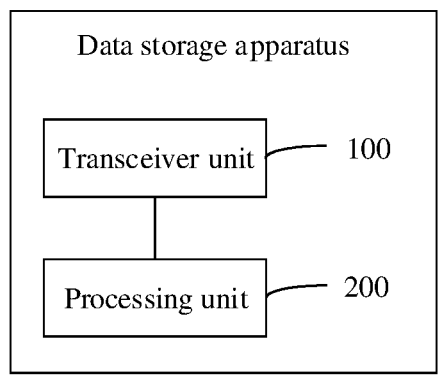
FIG. 9 is a schematic structural diagram of a data storage apparatus according to an embodiment.

An embodiment discloses a data storage apparatus. The apparatus is applied to a storage device, where the storage device includes at least a first memory page and a second memory page, the first memory page and the second memory page are of different types, and memory pages of different types have different read/write latency. Referring to a schematic structural diagram shown in FIG. 9, the apparatus includes a transceiver unit 100 and a processing unit 200.

The transceiver unit 100 is configured to receive first data and a latency level identifier of the first data, where the latency level identifier of the first data is used to indicate a requirement level of the first data for read/write latency.

The processing unit 200 is configured to: determine, based on the latency level identifier of the first data and correspondences between memory pages of different types and latency level identifiers, that a memory page corresponding to the first data is the first memory page; and store the first data on the first memory page.

The first data and the latency level identifier of the first data may be transmitted by a processor in a hierarchical storage system to the storage device.

Further, in the data storage apparatus disclosed in this embodiment, the processing unit is further configured to: before storing the first data on the first memory page, determine that the first memory page has a sufficient available capacity to store the first data.

Further, in the data storage apparatus disclosed in this embodiment, the transceiver unit is further configured to receive second data and a latency level identifier of the second data, where the latency level identifier of the second data is used to indicate a requirement level of the second data for read/write latency;

the processing unit is further configured to determine, based on the latency level identifier of the second data and correspondences between memory pages of different types and latency level identifiers, that a memory page corresponding to the second data is the first memory page; and when the available capacity of the first memory page is insufficient to store the second data, the processing unit is further configured to: select the second memory page from memory pages included in the storage device, where a difference between read/write latency of the second memory page and read/write latency of the first memory page is less than a preset threshold; and write the second data to the second memory page.

Further, in the data storage apparatus disclosed in this embodiment, the processing unit is further configured to: after storing the first data on the first memory page, when the latency level identifier of the first data is changed, migrate the first data from the first memory page to another memory page corresponding to a changed latency level identifier.

Further, in the data storage apparatus disclosed in this embodiment, the processing unit is further configured to: before migrating the first data from the first memory page to the another memory page corresponding to the changed latency level identifier, monitor that a migration condition has been satisfied.

Further, in the data storage apparatus disclosed in this embodiment, when a migration instruction corresponding to the first data is received, the processing unit is further configured to determine, based on the latency level identifier of the first data included in the migration instruction, whether the latency level identifier of the first data is changed.

In a feasible example, the storage device is a solid-state drive. Further, the storage device may alternatively be another storage device including at least two memory pages having different read/write latency. This is not limited in this embodiment.

According to the data storage apparatus disclosed in this embodiment, data can be stored based on different read/write latency of various memory pages included in the storage device. In other words, in the solution disclosed in this embodiment, differences between the read/write latency of the various memory pages in the storage device are used to implement hierarchical storage of data. In an existing hierarchical storage system, at least two storage devices with different read/write latency need to be configured. However, by using the solutions in the embodiments, only one storage device needs to be configured in a hierarchical storage system to implement hierarchical storage, thereby resolving the problem that the configuration of the existing hierarchical storage system is relatively complex.

Further, in the existing hierarchical storage system, storage devices having different read/write latency are connected to a processor in the hierarchical storage system by using a same interface card. However, different storage devices may have different requirements on the interface card. Therefore, compatibility processing further needs to be performed on the interface card to connect each storage device to the processor to obtain the hierarchical storage system.

In the solutions disclosed in the embodiments, only one storage device needs to be configured. Therefore, compatibility processing does not need to be performed on the interface card, thereby further simplifying a configuration manner of the hierarchical storage system.

Figure 10:
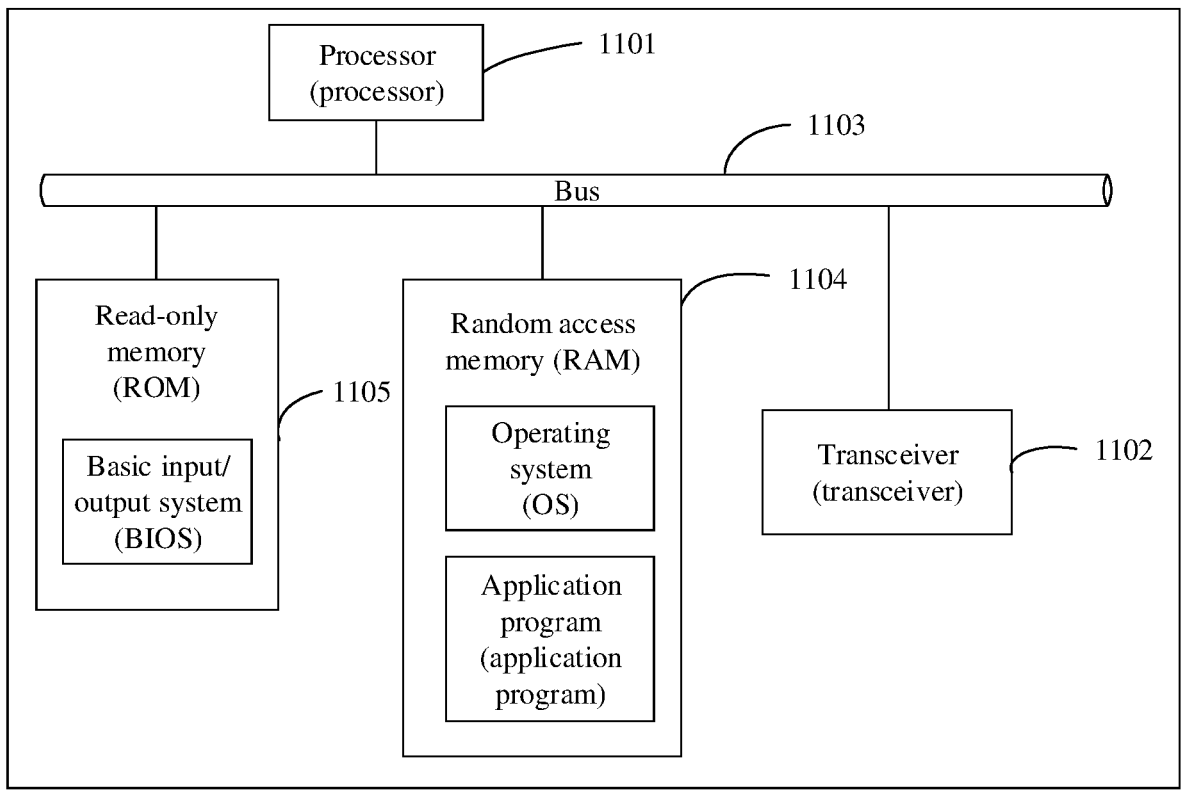
FIG. 10 is a schematic structural diagram of another data storage apparatus according to an embodiment.

Corresponding to the foregoing data storage method, in another embodiment, a data storage apparatus is further disclosed. Referring to a schematic structural diagram shown in FIG. 10, the data storage apparatus includes:

a processor 1101 and a memory.

The memory is configured to store program instructions.

The processor 1101 is configured to invoke and execute the program instructions stored in the memory, so that the data storage apparatus performs all or some of the steps in the embodiments corresponding to FIG. 2 to FIG. 8.

Further, the apparatus may further include a transceiver 1102 and a bus 1103. The memory includes a random access memory 1104 and a read-only memory 1105.

The processor 1101 is separately coupled to the transceiver 1102, the random access memory 1104, and the read-only memory 1105 by using the bus 1103. When the data storage apparatus needs to be run, a basic input/output system fixed in the read-only memory 1105 or a bootloader in an embedded system is used to guide the system to start, and the device is guided to enter a normal running state. After the device enters the normal running state, an application program and an operating system are run in the random access memory 1104, so that the data storage apparatus performs all or some of the steps in the embodiments corresponding to FIG. 2 to FIG. 8.

The data storage apparatus in this embodiment may correspond to the data storage apparatus in the embodiments corresponding to FIG. 2 to FIG. 8, and the processor or the like in the data storage apparatus may implement functions and/or various steps and methods performed by the data storage apparatus in the embodiments corresponding to FIG. 2 to FIG. 8. For brevity, details are not described herein again.

It should be noted that this embodiment may alternatively be a network device implemented based on a general physical server in combination with a network function virtualization (NFV) technology, and the network device is a virtual network device (for example, a virtual host, a virtual router, or a virtual switch). The virtual network device may be a virtual machine (VM) running a program for sending an advertisement packet, and the virtual machine is deployed on a hardware device (for example, a physical server). A virtual machine is a complete computer system that is simulated by software and has a complete hardware system function, that and runs in a completely isolated environment. Persons skilled in the art may virtually create, on a general physical server, a plurality of network devices having the foregoing functions. Details are not described herein.

During implementation, an embodiment further provides a computer-readable storage medium. The computer-readable storage medium includes instructions. When the computer-readable medium disposed in any device runs on a computer, the computer-readable medium may perform all or some of the steps of the embodiments corresponding to FIG. 2 to FIG. 8. The storage medium of the computer-readable medium may include: a magnetic disk, an optical disc, a read-only memory (ROM), or a random access memory (RAM), and the like.

In addition, another embodiment further discloses a computer program product including an instruction. When the computer program product runs on an electronic device, the electronic device is enabled to perform all or some of the steps in the embodiments corresponding to FIG. 2 to FIG. 8. The electronic device may be a storage device. The storage device includes at least a first memory page and a second memory page, the first memory page and the second memory page are of different types, and memory pages of different types have different read/write latency.

The storage device described in the embodiments may include a general-purpose processor, a digital information processor, an application-specific integrated circuit (ASIC), a field programmable gate array (FPGA) or another programmable logic device, a discrete gate or transistor logic, a discrete hardware component, or any design of a combination of the foregoing to implement or operate the described functions, and implement the data storage method disclosed in the embodiments by using the foregoing components or a design of a combination of the foregoing components. The general-purpose processor may be a microprocessor. Optionally, the general-purpose processor may alternatively be any conventional processor, controller, microcontroller, or state machine. The processor may alternatively be implemented by a combination of computing apparatuses, such as a digital information processor and a microprocessor, a plurality of microprocessors, one or more microprocessors with a digital information processor core, or any other similar configuration.

Steps of the methods or algorithms described in the embodiments may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may be connected to a processor, so that the processor can read information from the storage medium and write information to the storage medium. Optionally, the storage medium may alternatively be integrated into a processor. The processor and the storage medium may be disposed in an ASIC, and the ASIC may be disposed in UE. Optionally, the processor and the storage medium may alternatively be disposed in different components of the UE.

It should be understood that sequence numbers of the foregoing processes do not mean execution sequences in various embodiments. The execution sequences of the processes should be determined based on functions and internal logic of the processes and should not be construed as any limitation on the implementation processes of the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments are all described in a progressive manner. For same or similar parts in the embodiments, reference may be made to these embodiments. Each embodiment focuses on a difference from other embodiments. Especially, apparatus and system embodiments are basically similar to a method embodiment, and therefore are described briefly. For related parts, refer to partial descriptions in the method embodiment.

Persons skilled in the art may clearly understand that the technologies in the embodiments may be implemented by software in addition to a necessary general hardware platform. Based on such an understanding, the solutions in the embodiments essentially or the part contributing to the conventional technology may be implemented in a form of a software product. The computer software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments.

For parts that are the same and similar between the embodiments, reference may be made to each other. Especially, the apparatus embodiment is basically similar to a method embodiment, and therefore is described briefly. For related parts, refer to descriptions in the method embodiment.

What is claimed is:

1. A data storage method-comprising:
receiving first data and a latency level identifier of the first data, wherein the latency level identifier of the first data is for indicating a requirement level of the first data for access latency;
determining, based on the latency level identifier of the first data and correspondences between memory pages of different types and latency level identifiers, that a memory page corresponding to the first data is a first memory page of a storage device, wherein the storage device comprises the first memory page and a second memory page of the storage device, the first memory page and the second memory page are of different types, and memory pages of different types have different access latency values;
storing the first data on the first memory page;
migrating the first data from the first memory page to a third memory page corresponding to a changed latency level identifier when the latency level identifier of the first data is changed, wherein the latency level identifier is encapsulated into one data packet with the first data; and
determining a memory page having a highest read/write latency as the third memory page.

2. The data storage method according to claim 1, further comprising:
   determining that the first memory page has a sufficient available capacity to store the first data.

3. The data storage method according to claim 1, further comprising:
   receiving second data and a latency level identifier of the second data, wherein the latency level identifier of the second data indicates a requirement level of the second data for read/write latency;
   determining, based on the latency level identifier of the second data and correspondences between memory pages of different types and latency level identifiers, that a memory page corresponding to the second data is the first memory page;
   selecting the second memory page from memory pages comprised in the storage device when the available capacity of the first memory page is insufficient to store the second data, wherein a difference between access latency of the second memory page and access latency of the first memory page is less than a threshold; and
   writing the second data to the second memory page.

4. The data storage method according to claim 1, further comprising:
   monitoring that a migration condition has been satisfied.

5. The data storage method according to claim 1, further comprising:
   determining, based on the latency level identifier of the first data comprised in the migration instruction, whether a latency level of the first data is changed when a migration instruction corresponding to the first data is received.

6. The data storage method according to claim 1, wherein the storage device is a solid-state drive SSD.

7. The data storage method according to claim 1, wherein the correspondences between memory pages of different types and latency level identifiers are preset.

8. The data storage method according to claim 1, wherein a latency level identifier corresponding to a memory page having lower read/write latency indicates a higher requirement level for the read/write latency, so that data having the higher requirement level for the read/write latency is stored on a memory page having low read/write latency, and data having a lower requirement level for the read/write latency is stored on a memory page having high read/write latency.

9. A data storage apparatus, comprising:
   a processor;
   a first memory page; and
   a second memory page, wherein the first memory page and the second memory page are of different types in the data storage device, memory pages of different types have different access latency values and the processor is configured to:
   receive first data and a latency level identifier of the first data, wherein the latency level identifier of the first data is for indicating a requirement level of the first data for access latency;
   determine, based on the latency level identifier of the first data and correspondences between memory pages of different types and latency level identifiers, that a memory page corresponding to the first data is the first memory page;
   store the first data on the first memory page;
   migrate the first data from the first memory page to a third memory page corresponding to a changed latency level identifier when the latency level identifier of the first data is changed, wherein the latency level identifier is encapsulated into one data packet with the first data; and
   determine a memory page having a highest read/write latency as the third memory page.

10. The data storage apparatus according to claim 9, wherein the processor is further configured to:
    determine that the first memory page has a sufficient available capacity to store the first data.

11. The data storage apparatus according to claim 9, wherein the processor is further configured to:
    receive second data and a latency level identifier of the second data, wherein the latency level identifier of the second data indicates a requirement level of the second data for access latency;
    determine, based on the latency level identifier of the second data and correspondences between memory pages of different types and latency level identifiers, that a memory page corresponding to the second data is the first memory page; and
    select the second memory page from memory pages comprised in the storage device when the available capacity of the first memory page is insufficient to store the second data, wherein a difference between access latency of the second memory page and access latency of the first memory page is less than a threshold; and
    write the second data to the second memory page.

12. The data storage apparatus according to claim 9, wherein the processor is further configured to:
    monitor that a migration condition has been satisfied.

13. The data storage apparatus according to claim 9, wherein the processor is further configured to:
    determine, based on the latency level identifier of the first data comprised in the migration instruction, whether the latency level identifier of the first data is changed when a migration instruction corresponding to the first data is received.

14. The data storage apparatus according to claim 9, wherein the storage device is a solid-state drive (SSD).

15. The data storage apparatus according to claim 9, wherein the correspondences between memory pages of different types and latency level identifiers are preset.

16. The data storage apparatus according to claim 9, wherein a latency level identifier corresponding to a memory page having lower read/write latency indicates a higher requirement level for the read/write latency, so that data having the higher requirement level for the read/write latency is stored on a memory page having low read/write latency, and data having a lower requirement level for the read/write latency is stored on a memory page having high read/write latency.

* * * * *